UNITED STATES PATENT OFFICE.

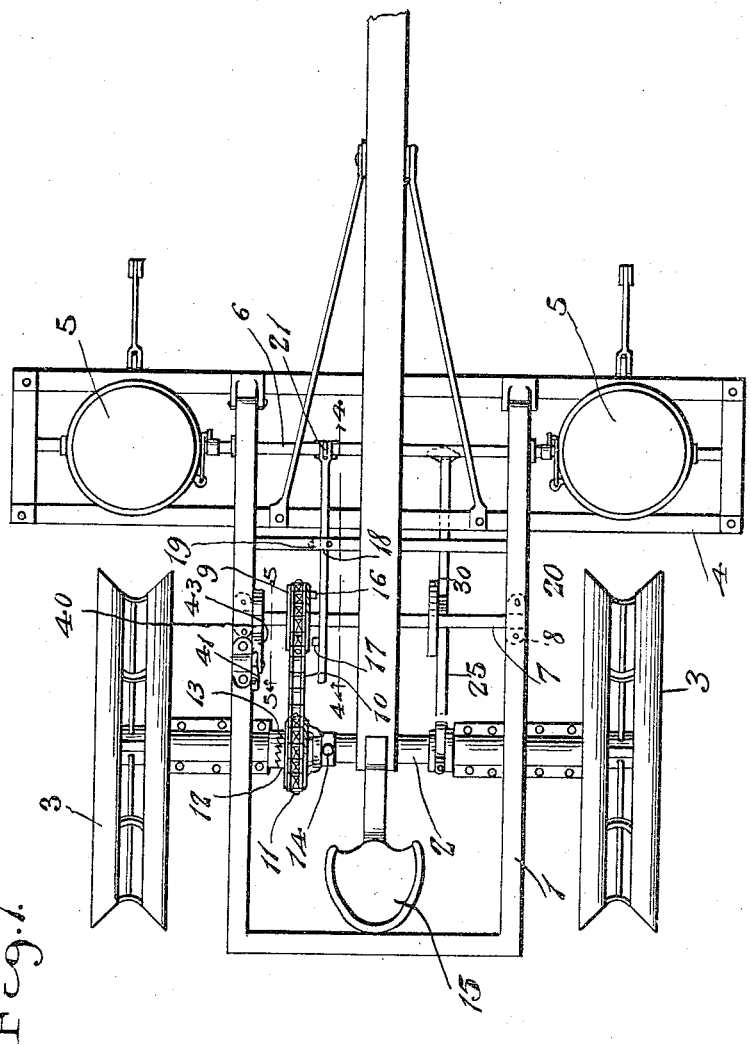

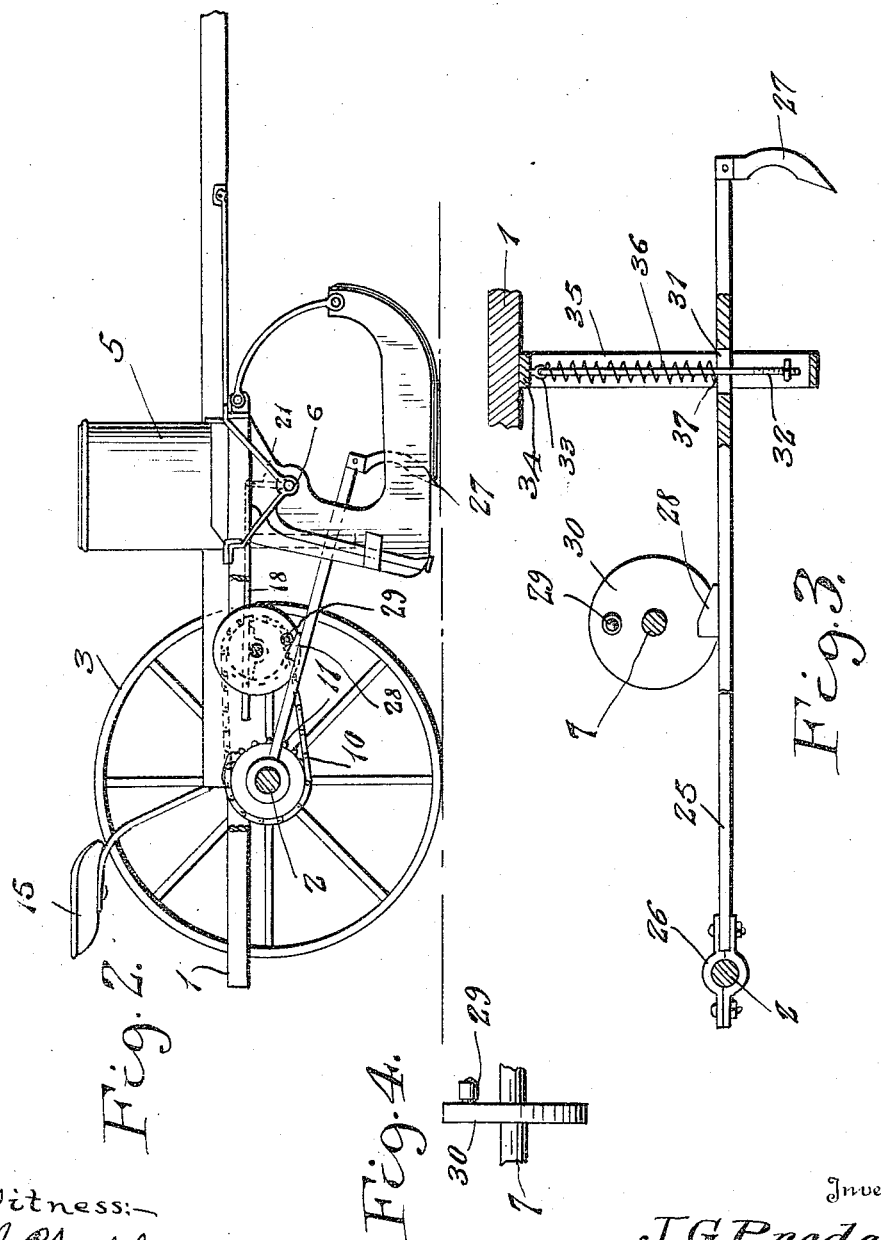

JOHN G. PREDA, OF HURLEY, WISCONSIN.

PLANTER.

1,267,115.  Specification of Letters Patent.  Patented May 21, 1918.

Application filed August 16, 1916. Serial No. 115,226.

*To all whom it may concern:*

Be it known that I, JOHN G. PREDA, a subject of the Emperor of Austria-Hungary, residing at Hurley, in the county of Iron and State of Wisconsin, have invented certain new and useful Improvements in Planters; and I do hereby declare the following to be a full, clear, and exact description of the invention, such as will enable others skilled in the art to which it appertains to make and use the same.

This invention relates to corn planters, and the primary object of the invention is to provide a corn planter which includes novel features of construction for checking the hills of grain planted, without the employment of the knotted wire usually employed in check row corn planters.

A further object of this invention is to provide a corn planter structure as specified which includes a shaft operatively connected to the main drive axle of the planter, and also to provide a pivotally mounted seed dispensing shaft operating lever which is operated at predetermined times during the rotation of the shaft for operating the seed dispensing shaft.

A still further object of this invention is to provide a marker structure which will make a visible mark upon the ground upon each operation of the seed dispensing mechanism, and which marker is operated by the rotation of the shaft which is operatively connected to the main drive axle of the planter.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of the improved corn planter.

Fig. 2 is a side elevation of the corn planter.

Fig. 3 is a fragmentary section of the corn planter showing the marker structure.

Fig. 4 is a detail elevation of a part of the structure employed for operating the marker.

Referring more particularly to the drawings, 1 designates the supporting frame of the corn planter as an entirety, which rotatably supports a main drive axle 2, upon the outer spindle ends of which are mounted the usual type of supporting wheels 3, that are employed in corn planter structures.

The supporting frame 1 has an auxiliary transversely extending frame 4 attached to its forward end which carries the seed dispensing structures 5. The seed dispensing structures 5 are of the ordinary type, and they are operated by the rocking of a shaft 6, which shaft is preferably rectangular shaped in cross section.

A shaft 7 is rotatably supported by suitable bearings 8 intermediate of the axle 2 and the front rocker shaft 6. The shaft 7 has a sprocket 9 mounted thereon which is operatively connected through the medium of the sprocket chain 10 with a sprocket 11 which is loosely mounted upon the axle 2. The sprocket 11 has a clutch face or segment 12 formed thereon which is adapted for coaction with the clutch segment 13 which is rigidly carried by the shaft 2 for rotation therewith. A hand lever 14 is connected to the sprocket 11 and extends upwardly so that it may be conveniently reached by an operator seated upon the seat 15. The lever 14 is provided for shifting the sprocket 11 upon the axle, for moving the clutch segment 12 into or out of engagement with the clutch segment 13 for regulating the rotation of the sprocket by the rotation of the axle 2.

The sprocket 9, which is carried by the shaft 7 has a pin 16 attached to one face of the same and projecting outwardly therefrom. The pin 16 is positioned a short distance inwardly from the periphery of the sprocket 9 as clearly shown in Fig. 1 of the drawings.

The pin 16 engages, during the rotation of the sprocket 9, a pin 17 which is carried by a pivotally mounted arm 18. The arm 18 is pivotally connected, to an upstanding arm 19 which is formed upon a laterally extending brace 20. The forward end of the arm 18 has a forked member 21 pivotally connected to its forward end, and extending downwardly therefrom, which is connected to the operating shaft 6.

During the rotation of the shaft 7, by the axle 2, the pin 16 will strike the pin 17, and rock the lever 18, which will in turn rock the shaft 6 sufficiently to operate the seed dispensing mechanisms 5, for permitting of the deposit of grain kernels therefrom.

A marker structure is provided for making a visible mark on the ground, in alinement with the hills of grain planted, and it includes a marker arm 25, which is pivotally mounted upon the axle 2, and as shown at 6, in Fig. 3 of the drawings. The marker arm 25 extends forwardly from the shaft 2 and has a gouging shovel 27 attached to its forward end. An upstanding lug 28 is attached to the upper edge of the marker bar 25 intermediate of its ends, and it is positioned in the path of a pin 29, which is carried by a disk 30. The disk 30 is mounted upon the shaft 7, for rotation therewith, and the pin 29 is attached to the disk in a position similar to that of the pin 16, so that when the pin 16 strikes the pin 17, the pin 29 will strike the lug 28 for pivotally moving the marker bar 25 for causing the gouging shovel 27 to gouge the ground for making a visible mark or designation thereon.

The arm 25 is provided with an opening 31 formed therein through which a bolt 32 extends. The bolt 32 is attached as is shown at 33 to a bar 34 which is attached to the frame 1. A bracket 35 extends downwardly from the frame 1 upon each side of the bar 25 and guides the movement of the same. A spiral spring 36 is coiled about the bolt 32 and connected to the marker bar as shown at 37. The spring 36 is provided for automatically moving the marker bar 25 into an upward inoperative position immediately after the pin 29 has moved out of engagement with the lug 28, and the marker bar is pointed downwardly for making a mark in the ground against the tension of the spring 36.

A ratchet wheel 40 is mounted upon the shaft 7. A hand lever 41 is pivotally connected to the frame 1 and it has a pawl 43 pivotally connected thereto which is adapted to coact with the ratchet teeth formed upon the periphery of the ratchet 40, for manually rotating the shaft 7, for operating the seed dispensing mechanisms, manually, when desired.

From the foregoing description taken in connection with the accompanying drawings the advantages of construction and of the method of operation of the improved planter will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

1. In a corn planter structure, the combination, of a supporting frame, a seed dispensing mechanism carried by said supporting frame, an axle carried by said frame, a shaft rotatably supported by said frame, means operatively connecting said shaft and said axle, a marker bar pivotally connected to said axle and extending forwardly therefrom, a gouging shovel carried by the forward end of said marker bar, a disk mounted upon said second named shaft, a pin carried by said disk and adapted for engaging said marker bar during the rotation of said disk for pivotally moving the marker bar into a marking position.

2. In a corn planter structure, the combination, of a supporting frame, a seed dispensing mechanism carried by said supporting frame, an axle carried by said frame, a shaft rotatably supported by said frame, means operatively connecting said shaft and said axle, a marker bar pivotally connected to said axle and extending forwardly therefrom, a gouging shovel carried by the forward end of said marker bar, a disk mounted upon said second named shaft, a pin carried by said disk and adapted for engaging said marker bar during the rotation of said disk for pivotally moving the marker bar into a marking position, and means for guiding the vertical or pivotal movement of said marker bar, and a spring attached to said marker bar for returning said marker bar to an inoperative position after it has been forced downwardly by said pin during the rotation of said disk.

In testimony whereof I affix my signature in presence of two witnesses.

JOHN G. PREDA.

Witnesses:
M. LAMBRIX,
GRIFF THOMAS.

Copies of this patent may be obtained for five cents each, by addressing the "Commissioner of Patents, Washington, D. C."